(12) United States Patent
Cheng et al.

(10) Patent No.: US 10,424,793 B2
(45) Date of Patent: Sep. 24, 2019

(54) ELECTRODEPOSITED COPPER FOIL AND METHOD FOR PRODUCING THE SAME, AND CURRENT COLLECTOR FOR LITHIUM SECONDARY BATTERY AND SECONDARY BATTERY COMPRISING THE ELECTRODEPOSITED COPPER FOIL

(71) Applicant: CHANG CHUN PETROCHEMICAL CO., LTD., Taipei (TW)

(72) Inventors: Kuei-Sen Cheng, Taipei (TW); Huei-Fang Huang, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 15/812,738

(22) Filed: Nov. 14, 2017

(65) Prior Publication Data

US 2019/0148736 A1 May 16, 2019

(51) Int. Cl.
| | |
|---|---|
| *H01M 4/70* | (2006.01) |
| *H01M 4/66* | (2006.01) |
| *H01M 10/0525* | (2010.01) |
| *C25D 3/38* | (2006.01) |
| *H01M 10/0585* | (2010.01) |
| *C25D 7/06* | (2006.01) |

(52) U.S. Cl.
CPC ............... *H01M 4/70* (2013.01); *C25D 3/38* (2013.01); *C25D 7/0657* (2013.01); *H01M 4/661* (2013.01); *H01M 4/667* (2013.01); *H01M 10/0525* (2013.01); *H01M 10/0585* (2013.01)

(58) Field of Classification Search
CPC .......................... H01M 4/661; H01M 10/0585; C25D 7/0657; C25D 3/38
See application file for complete search history.

(56) References Cited

U.S. PATENT DOCUMENTS

2013/0115510 A1* 5/2013 Tani .................... H01M 4/0404
429/199

* cited by examiner

*Primary Examiner* — Ladan Mohaddes
(74) *Attorney, Agent, or Firm* — Nixon Peabody LLP; Thomas P. Pavelko

(57) ABSTRACT

An electrodeposited copper foil of high toughness having a lightness L* value of the deposit side in the range of 36 to 74, the copper foil having a tensile strength in the range of 40 to 70 kg/mm², and a weight deviation of less than 3%. The electrodeposited copper foils are particularly useful as current collectors for anode components of rechargeable secondary batteries and tend not to form wrinkles during charge-discharge cycles of the battery and are resistant to fracture during pressing of the anode active materials onto the copper foil. Secondary batteries and methods of manufacture are also described.

19 Claims, 5 Drawing Sheets

ELECTRODEPOSITED COPPER FOIL AND METHOD FOR PRODUCING THE SAME, AND CURRENT COLLECTOR FOR LITHIUM SECONDARY BATTERY AND SECONDARY BATTERY COMPRISING THE ELECTRODEPOSITED COPPER FOIL

TECHNICAL FIELD

The present disclosure describes an electrodeposited copper foil, and a method of making the copper foil, which copper foil has a high toughness property, primarily for use as a current collector in rechargeable lithium secondary battery, especially laminated type high energy capacity lithium secondary battery. A method for making a rechargeable battery utilizing the electrodeposited copper foil of high toughness is also disclosed.

BACKGROUND

Electrification is the most viable way to achieve clean and efficient transportation that is crucial to the sustainable development of the entire world. In the near future, electric vehicles (EV), including hybrid electric vehicles (HEVs), plug-in hybrid electric vehicles (PHEVs), and pure battery electric vehicles (BEVs) will dominate the clean vehicle market. By 2020, it is expected that more than half of new vehicle sales will likely be EV models. The key and the enabling technology to this revolutionary change in transportation is the battery. EV batteries are quite different from those used in consumer electronic devices, such as laptops and cellphones. They are required to handle high power (up to a hundred kW) and have high energy capacity (up to tens of kW) within a limited space and weight and at an affordable price. The current two major battery types used in EVs today are nickel metal hydride (NiMH) and lithium type. Nearly all HEVs available in the market today use NiMH batteries because of its mature technology. Due to the potential of obtaining higher specific energy and energy density, the adoption of lithium secondary batteries is expected to grow fast in EVs, particularly in PHEVs and BEVs.

Laminated type lithium secondary batteries for both EV and HEV applications feature a structure in which stacked cathodes and anodes are alternately stacked with a separator sandwiched between and then sealed with a laminate film. The batteries are able to achieve a large capacity because of having an extremely compact shape. In addition, because of the simple structure, the batteries are lightweight and maintain a competitive advantage from a cost perspective as well.

A laminated type lithium secondary battery that boasts of advanced heat dissipation as compared to conventional cylindrical batteries. Because the laminated type lithium secondary battery has a broad surface area, the battery is better able to dissipate heat, and increases in the overall temperature of the battery due to charging and discharging can be kept low. Therefore, electric vehicles that adopt batteries of laminated type can simplify countermeasures against heat.

Cylindrical lithium secondary batteries (also known as wound type batteries), have an anode and a cathode which are cut into two long strips, and together with a separator, that keeps the anode and cathode apart, are wound on a cylindrical mandrel, to form a jelly roll (also known as a Swiss roll in the United Kingdom). Cylindrical battery thus has only two electrode strips which simplifies the construction of the battery considerably. The cylindrical design has good cycling ability, offers a long calendar life and is economical, but is heavy and has low packaging density due to it space cavities. The cylindrical cell is commonly used for portable applications.

Essentially, high elongation copper foil is more appropriate as a current collector in cylindrical batteries. When a cylindrical battery expands during its charge and discharge, the outermost circle of copper foil will expand more than the innermost (or inner) circles. If the copper foil does not possess high elongation, the outermost circle of copper foil will easily fracture.

Heretofore, a copper foil was used as a current collector of negative electrode (anode) in rechargeable lithium secondary batteries. The surface of the copper foil was coated with a layer of anode active material. Because the layer of anode active material expands and shrinks as it stores and releases lithium-ion, a stress is engendered in the current collector (copper foil) during a charge-discharge cycle and occasionally causes formation of wrinkles. The formation of wrinkles in the copper foil not only increases a volume of the negative electrode (anode) but also disturbs uniformity of an electrode reaction, resulting in a reduction of an energy density.

For laminated type lithium secondary battery, the expansion of the copper foil in X or Y direction of a laminated battery is not as much as in the cylindrical lithium secondary battery. Thus, the art has tended to use high tensile strength copper foils as a more appropriate current collector in laminated type lithium secondary battery. When a copper foil has high tensile strength, the copper foil has a high strength, it is more difficult to deform and cause wrinkles in the copper foil during the charge/discharge cycle of the battery.

In order to have high energy capacity, the thickness of the copper foil needs to be decreased, because at a same volume of a lithium secondary battery, more active materials can be employed. However, when the thickness of the copper foil decreases, the strength of the copper foil also decreases. After charging/discharging cycle of the battery, the thinner copper foil is easy to deform and cause wrinkles. Up until this disclosure, people like to use high tensile strength copper foil, which is difficult to deform thus causing wrinkles. However, for a conventional copper foil, when one increases the tensile strength of the foil, one basically reduces its elongation. It means that the copper foil becomes strong, but brittle.

In order for a lithium secondary battery to have a higher energy capacity, in addition to decreasing the thickness of the copper foil, a higher pressing pressure, used to condense the anode active material on the copper foil's surface, is necessary so that the lithium secondary battery can contain more anode active material. The use of conventional copper foil, of high tensile strength, means that the copper foil is not easy to deform and cause wrinkle during the charging/discharging cycle. However, this conventional copper foil, being brittle, is easily fractured at the interface of the copper foil/anode active material (carbon material) if the copper foil is subjected to higher pressure during pressing to consolidate the anode active material.

Accordingly, all these deficiencies in the prior art copper foils, especially copper foils for use as current collectors in currently available laminated type lithium secondary batteries, required the present inventors to not only recognize the deficiencies in current batteries and the components of such batteries, but also to formulate new copper foils, composites of copper foil/anode active materials, methods of production employing higher pressing pressures used to consolidate greater amounts of anode active materials, and to provide improved lithium secondary batteries of high capacity than heretofore available for the same volume battery. It is desirable to provide a rechargeable secondary battery, an electric tool, an electric vehicle, and a power storage system which can obtain an excellent battery capacity characteristic and cycle characteristics.

SUMMARY

A strength of a material, in particular, a copper foil, is calculated by the following relationship:

Strength (kgf/mm)=tensile strength (kgf/mm$^2$)*thickness (mm).

When copper foil has a high strength, it is more difficult to cause deformation and wrinkles. If two copper foils have the same tensile strength, the thicker copper foil will have the higher strength. If two copper foils have the same thickness, the higher tensile strength copper foil will have the higher strength. If a thickness of a copper foil is made to decrease, it is necessary to increase the tensile strength of the foil in order to maintain the strength of the foil. High strength does not necessarily mean high toughness, but high toughness represents high strength.

The new copper foils for use as components of a lithium secondary battery, in particular, a laminated type lithium secondary battery, must possess toughness, not merely high tensile strength. Toughness can be determined by integrating the stress-strain curve of a material, in this case, a copper foil. It is the energy of mechanical deformation per unit volume prior to fracture. In order to be tough, a copper foil which has both strong (high tensile strength) and ductile (high elongation) is an essential requirement.

Therefore, it is an object of the present disclosure to provide an electrodeposited copper foil which has high toughness property for use in rechargeable lithium secondary battery, especially laminated type high energy capacity battery.

It is an further object of the disclosure to provide a process of manufacturing an electrodeposited copper foil of high toughness by depositing on the surface of a rotating drum, with the surface of the rotating drum at least partially immersed in a copper-containing electrolytic solution, under the influence of an electric current passing through the electrolytic solution, with the drum acting as cathode and at least one anode in contact with the electrolytic solution, to form a copper foil. The surface of the copper foil formed against the drum is termed the "drum side" of the copper foil. The opposite surface of the copper foil, or that portion of the copper foil which faced the electrolytic solution during formation, is called the "deposit side" of the copper foil.

It is also an object of the present disclosure to provide a method of manufacturing an anode for a lithium secondary battery from a composite of an electrodeposited copper foil and anode active material by pressing where the electrodeposited copper foil used in the manufacturing is not only resistant to deformation and wrinkles when used in a battery after charging and discharging, but also resistant to fracture at the interface of the anode active material and the electrodeposited copper foil after high pressure pressing to consolidate the anode active material on the electrodeposited copper foil.

Characteristically, it is a further object of the present invention to provide an electrodeposited copper foil which exhibits a tensile strength in the range of 40 to 70 (kg/mm$^2$) and a lightness L* value on the deposit side of the copper foil, based on the L*a*b* color system, in the range of 36 to 74.

It is a still further object of this disclosure to provide a surface roughness (Rz) on the drum side of the copper foil of less than 2.5 μm. In fact, it is an object of the invention to provide an electrodeposited copper foil having a surface roughness (Rz) of less than 2.5 μm on both the drum side and the deposit side of the electrodeposited copper foil, and a still further object to provide such an electrodeposited copper foil with a difference in surface roughness (Rz) between the drum side and the deposit side of 1.3 μm, or less.

In further embodiments, it is a purpose of the present disclosure to maintain a weight deviation of the electrodeposited copper foil to less than 3%. Weight deviation is defined by the following relationship:

$$\text{Weight deviation (\%)} = \frac{\text{Maximum area weight (g/m}^2\text{)} - \text{minimum area weight (g/m}^2\text{)}}{\text{Average area weight (g/m}^2\text{)}} \times 100$$

It is a still further object of the invention to provide components of a rechargeable lithium secondary battery utilizing the aforementioned electrodeposited copper foil, in conjunction with anode active material, to act as a current collector in the battery.

It is a further object to disclose methods of manufacturing a high capacity laminated type lithium secondary battery and a rechargeable lithium secondary battery containing the electrodeposited copper foil disclosed herein as a component thereof.

The foregoing and additional objects of the invention will be best understood with the following description of the preferred embodiments in conjunction with the appended drawings.

DESCRIPTION OF THE PREFERRED EMBODIMENTS

As used throughout the various drawing figures, like elements in different views may be given a common numeral labeling, to assist the reader in understanding the various embodiments.

Figure 1A:
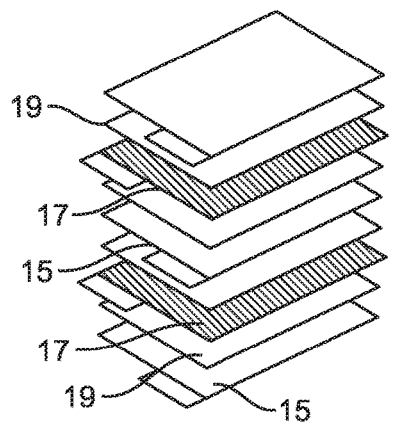
FIG. 1A is an exploded schematic view of the stacked electrodes in a laminated type lithium secondary battery.
Figure 1B:
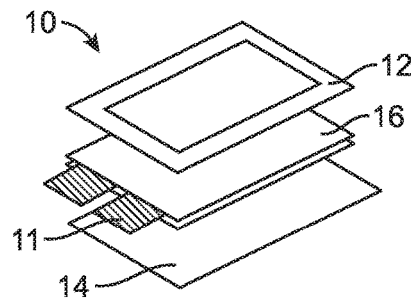
FIG. 1B is a schematic view of the stacked electrodes of FIG. 1A, with lead tabs being attached to the stacked electrodes between laminate films.
Figure 1C:
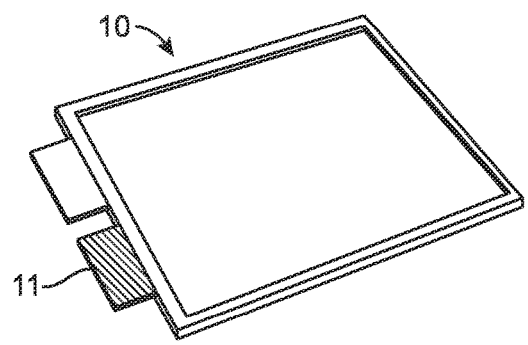
FIG. 1C illustrates a final form of a laminated type lithium secondary battery.
Figure 2:
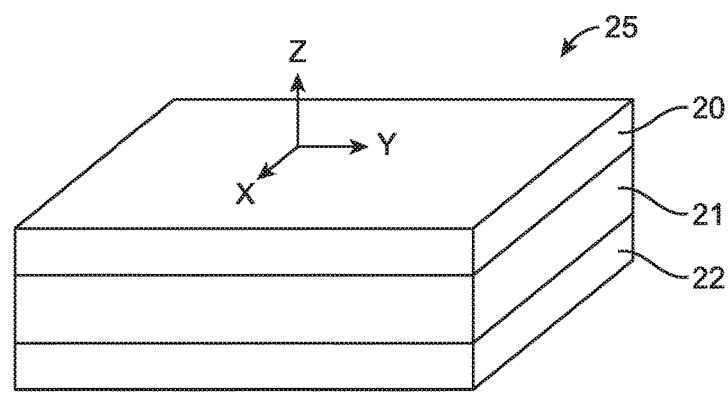
FIG. 2 is a schematic representation of anode active material in combination with the copper foil according to one embodiment of the disclosure, and additionally illustrates the X, Y and Z-axes of the copper foil.
Figure 9:
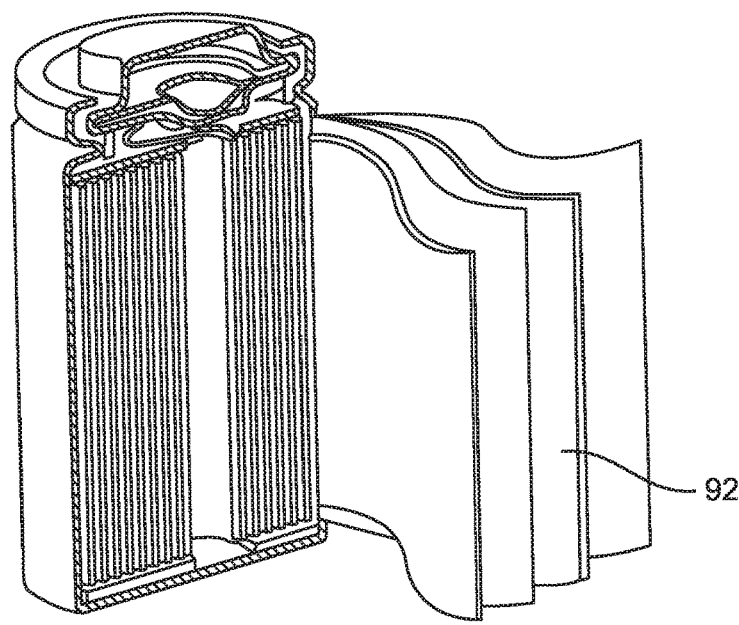

The laminated type battery is formed by discontinuously placing an anode active material along a portion of the electrodeposited copper foil. Together, they are fed into nip of a roller press and consolidated under pressure to form an anode. The anode is then stacked with cathode in an alternating manner in a container, with a separator placed between each adjacent anode/cathode. Container is then filled with electrolyte and sealed to form a laminated type lithium secondary battery. As shown in FIG. 1C is a laminated type rechargeable lithium secondary battery 10 having lead tab 11 for connection of the battery 10 to external system components of the EV (not shown). Laminate film 12, 14 forms the outer package of the battery 10 as shown in FIG. 1B. Lead tab 11 can also be seen attached to the stacked electrodes 16 in FIG. 1B. The exploded view of FIG. 1A more clearly illustrates the components of the stacked electrodes of FIG. 1B. A plurality of anodes 15 and cathodes 17 are stacked with separators 19 placed between each adjacent anode 15 and cathode 17 in the stack. The anode 15 comprises an anode active material 20, 22 consolidated on a copper foil 21 according to the present disclosure as shown in FIG. 2. In a laminated type lithium secondary battery 10, the expansion along the X and Y axes of the copper foil is not as much as the expansion of the negative electrode 92 of a cylindrical battery 90 as shown in FIG. 9.

In order to increase the capacity of the battery 10, a reduction in the thickness of the copper foil would permit an increased number of anodes in a given volume of the battery 10. However, decreasing the thickness of a copper foil of given tensile strength also reduces its strength. The relationship between strength and tensile strength can be visualized by the following relationship:

Strength (kgf/mm)=tensile strength (kgf/mm$^2$)*thickness (mm)

Figure 3:
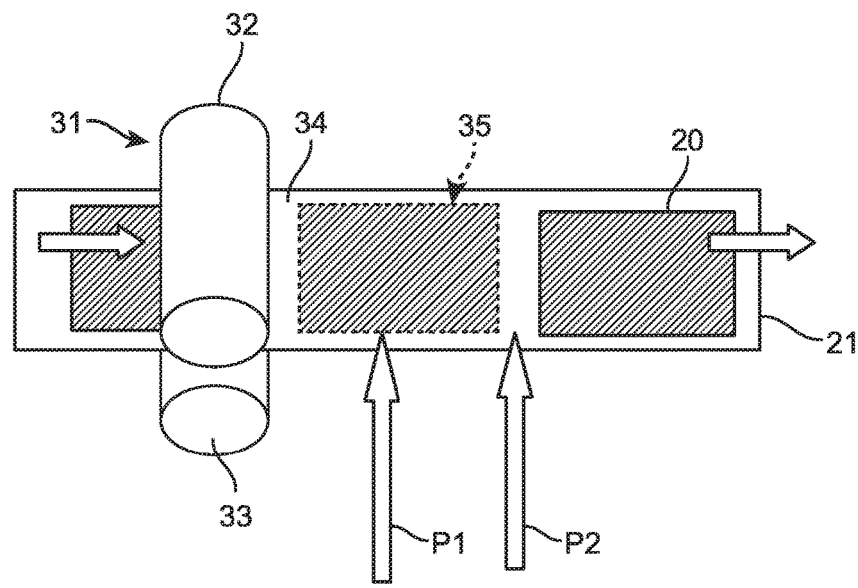
FIG. 3 is a schematic illustration of the process of consolidating an active anode material by pressing the anode active material and copper foil with a roller press.

Thus, strength of the copper foil can be made greater by increasing the thickness of the foil; by increasing the tensile strength of a copper foil; or increasing both the thickness and tensile strength of the copper foil. However, if it is required to reduce the thickness of the copper foil, in order to increase the electrical capacity of a lithium secondary battery of given volume, then one must increase the tensile strength of the copper foil to maintain its strength. However, the present applicant has found that increasing the tensile strength of a copper foil for use in a rechargeable lithium secondary battery presents new disadvantages. Increasing the tensile strength of a copper foil makes it brittle. Furthermore, in order to consolidate more of the anode active material 20 on the copper foil 21, a higher consolidation pressure must be applied to each of the anode active material 20 and the copper foil 21. This higher consolidation pressure, shown schematically in FIG. 3, utilizes a roller press 31, where the rollers 32, 33 of the roller press 31 create a nip through which both the copper foil 21 and anode active material 20 pass through simultaneously. As the anode active material 20 is positioned intermittently on copper foil 21, it is clear that a higher pressing pressure P1 exists when both the copper foil 21 and anode active material 20 are in the nip of roller press 31 than the pressure P2 when only the portion 34 of copper foil 21 is in the nip. It therefore becomes easy to fracture at the interface 35 of the anode active material 20 and copper foil 21.

Figures 4A, 4B, 4C:
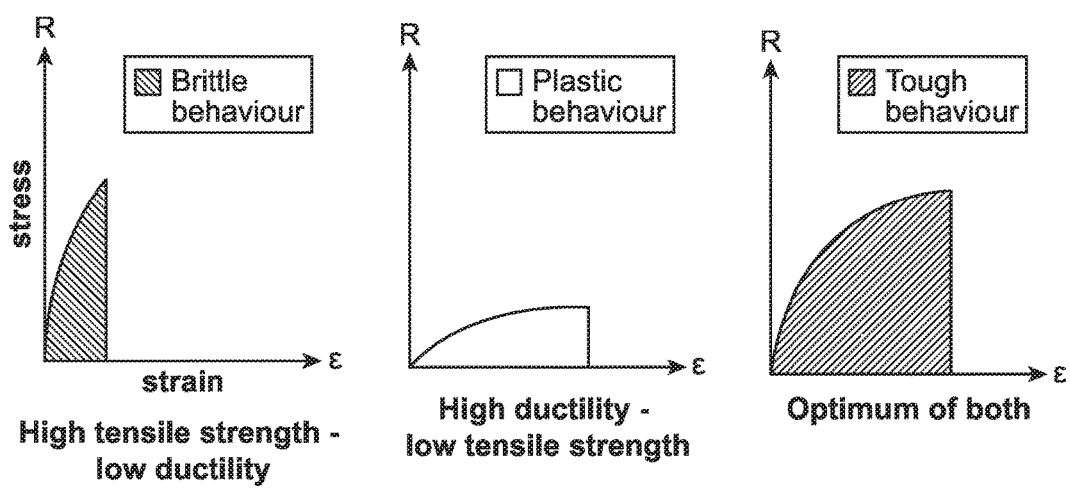
FIG. 4A is a graphic representation of a stress-strain curve of a high tensile strength, low ductility copper foil.
FIG. 4B is a graphic representation of a high ductility, low tensile strength copper foil.
FIG. 4C is a graphic representation of toughness property of a copper foil obtained by integrating the stress-strain curve.

Therefore, the present applicant has devised a new electrodeposited copper foil having a high toughness, rather than merely a high tensile strength. As shown in FIG. 4A, which is a stress-strain curve of a high tensile strength, low ductility copper foil, this copper foil is brittle and easy to fracture. Thus, any attempt to maintain strength by increasing the tensile strength of a copper foil while reducing its ductility leads to more brittle materials which are more easily fractured. On the other hand, as shown in the stress-strain curve of a high ductility, low tensile strength copper foil in FIG. 4B, the copper foil is soft. After charging and discharging, the copper foil is easily deformed and creates wrinkles. Applicant has envisioned an electrodeposited copper foil of high toughness, which is determined by integrating the stress-strain curve of the copper foil. As shown in FIG. 4C, this copper foil has high tensile strength and high ductility, making the integration of the stress-strain curve a maximum value.

Figure 5:
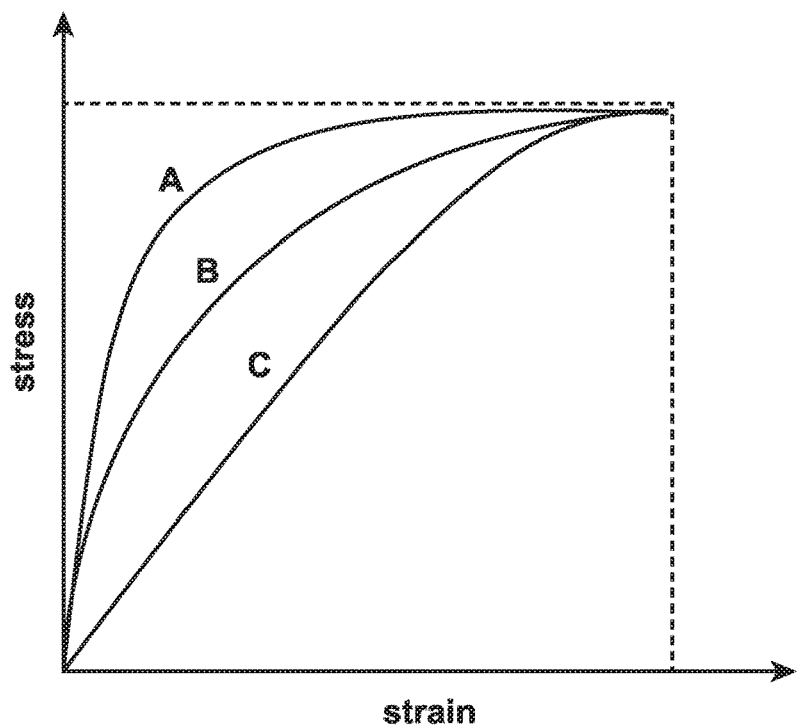
FIG. 5 is a graphic comparison of the stress-strain curves of three copper foils A, B and C.

This will be better understood by reference to FIG. 5 where the stress-strain curves of three copper foils A, B and C are all plotted on the same scale. According to the stress-strain curves of copper foils A, B and C, they each possess the same tensile stress and ductility (elongation), but copper foil A has a higher toughness than copper foils B and C. Even if the copper foil has the same tensile strength and elongation, it does not mean that it has the same toughness. Applicant has found that an electrodeposited copper foil having a tensile strength in the range of 40 to 70 kg/mm$^2$ and a lightness L* value of the deposit side, based upon the L*a*b* color system, in the range of 36 to 74, the copper foil has a better toughness than foils outside these limits. If the tensile strength is lower than 40 kgf/mm$^2$, the strength of copper foil is lower and the copper foil is easily subjected to deformation and causes wrinkles after charging and discharging. If the tensile strength is higher than 70 kgf/mm$^2$, the copper foil becomes more brittle and is easy to fracture after the high pressure pressing process.

Identifying Color Differences Using CIE L*a*b* Coordinates. Differences in color between two objects cannot always be apparent to the unaided human eye. Thus, optically aided devices, such as those sold by the Konica-Minolta company, under its brand for the spectrophotometer CM-2500c are often used. Of course, other devices may be substituted for the Konica-Minolta device. As defined by the Commission Internationale de l'Eclairage (CIE), the L*a*b* color space was modeled after a color-opponent theory stating that two colors cannot be red and green at the same time or yellow and blue at the same time. In the L*a*b* color system, L* indicates lightness, a* is the red/green coordinate, and b* is the yellow/blue coordinate.

Thus, the L*a*b* color system establishes a standard by which the color of the deposit side of an electrodeposited copper foil can be measured. As noted above, the L* value of the deposited side, based upon the L*a*b* color system, in the range of 36 to 74, such as between about 36, 40, 45, 50, 55, 60, 65, 70 and 74. When the lightness value L* of the deposit side is lower than 36, the electrodeposited copper foil is soft. If L* value is larger than 74, the electrodeposited copper foil becomes more brittle. In some cases, the electrodeposited copper foil has an a* value of the deposit side, in the range of 11% to 18%, such as between 11, 12, 13, 14, 15, 16, or 17% and 18%. In some cases, the electrodeposited copper foil has a b* value of the deposit side, in the range of 9% to 13%, or between 9, 10, 11, 12% and 13%.

Figure 6:
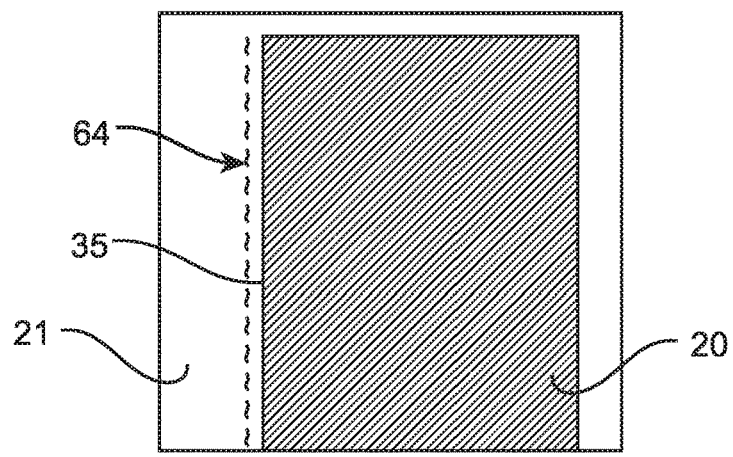
FIG. 6 is a schematic illustration depicting wrinkles at the interface of a copper foil and anode active material consolidated on the copper foil.

It is also important that the surface roughness (Rz) of the deposit side of the electrodeposited copper foil is greater than 0.5 μm and lower than 2.5 μm. In a particularly preferred embodiment, the surface roughness (Rz) of the drum side of the electrodeposited copper foil is also less than 2.5 μm. As used throughout this specification and claims, surface roughness is measured and provided as "Rz" standard, (utilizing JIS B 0601-1994, using an α-type surface roughness and contour measuring instrument manufactured by Kosaka Laboratory Ltd. (Model Type: SE1700), although there are other systems available to measure surface roughness. Not all measurement systems of surface roughness are equivalent. According to this Rz standard, the results are presented as an average of 10 points. Furthermore, the difference in surface roughness (Rz) between the drum side and deposit side is 1.3 μm, or less. If the surface roughness (Rz) of the deposit side is larger than 2.5 μm, the copper foil is easy to cause fracture at the interface between the anode active material and the electrodeposited copper foil after the high pressure pressing process. In preferred embodiments the surface roughness (Rz) of the drum side of the electrodeposited copper foil is lower than 2.5 μm. If the difference in surface roughness (Rz) between the drum side and the deposit side is larger than 1.3 μm, it is easy to cause wrinkles after high pressure pressing process at the interface 35 between anode active material 20 and the copper foil 21. FIG. 6 illustrates the wrinkles 64 at the interface 35.

Weight deviation sometimes occurs during the process of manufacturing copper foils. However, when making electrodeposited copper foils according to this disclosure, the weight deviation of the electrodeposited copper foil is lower than 3%. Weight deviation is calculated according to the following relationship:

$$\text{Weight deviation (\%)} = \frac{\text{Maximum area weight (g/m}^2\text{)} - \text{minimum area weight (g/m}^2\text{)}}{\text{Average area weight (g/m}^2\text{)}} \times 100$$

When the weight deviation of electrodeposited copper foil is larger than 3%, the variations in thickness easily lead to formation of wrinkles after high pressure pressing process at the interface between the anode active material and the electrodeposited copper foil.

Figure 7:
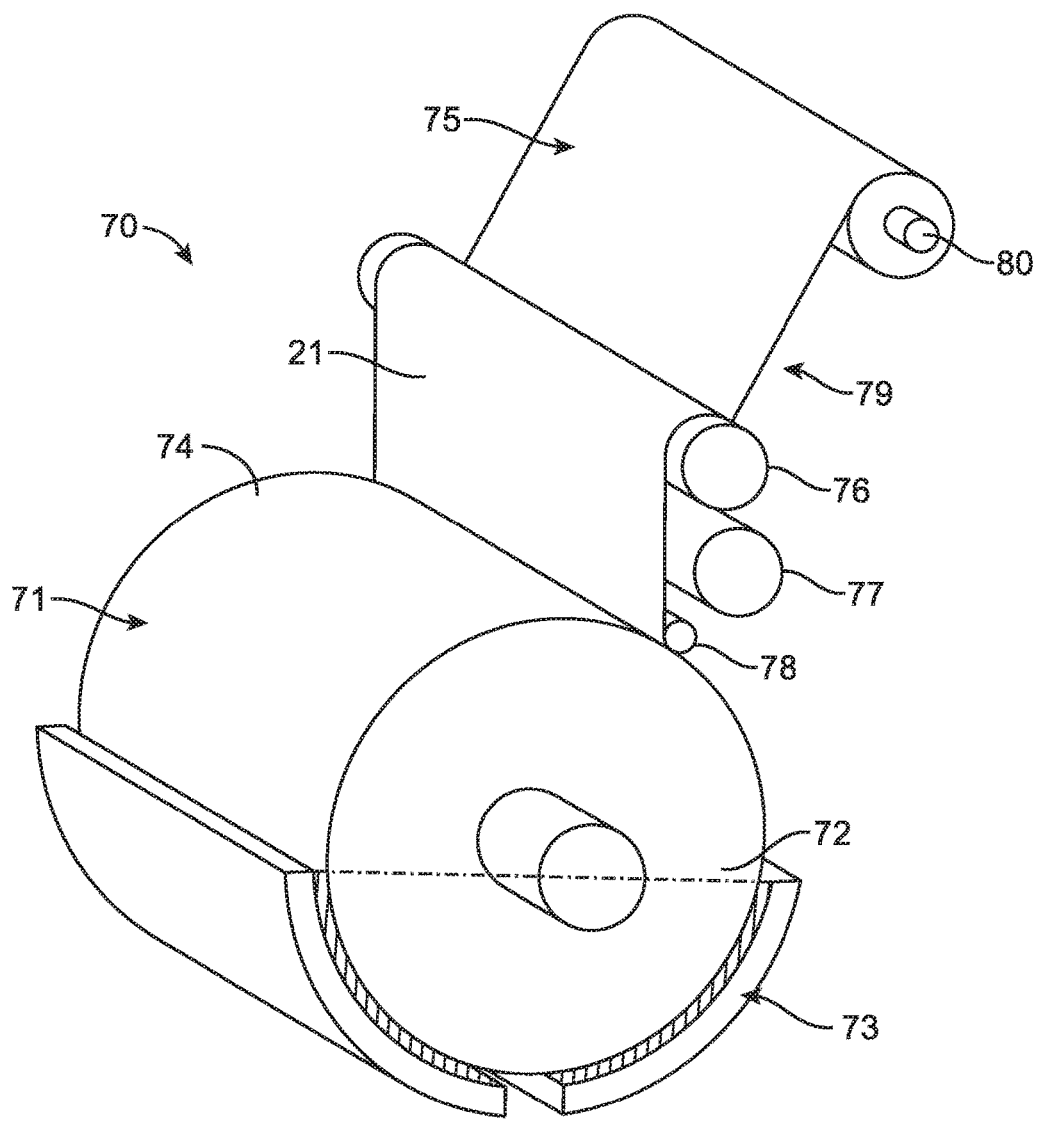
FIG. 7 is a schematic representation of an apparatus for making the electrodeposited copper foil according to a preferred embodiment.

A typical device 70 for manufacturing an electrodeposited copper foil is schematically illustrated in FIG. 7. The manufacturing process involves dissolving copper wires in a 50 wt % sulfuric acid aqueous solution to prepare a copper sulfate electrolyte containing copper sulfate and sulfuric acid and at least one additive selected from the group consisting of gelatin, sulfonic acid modified polyvinyl alcohol, N, N'-diethylthiourea, sodium 3-mercapto-1-propane sulfonate, chloride ion and combinations thereof. A rotatable metal cathode drum 71 is disposed in a partially submerged position with regard to a copper-containing electrolytic solution 72. An insoluble metal anode 73, preferably insoluble in copper-containing electrolytic solution 72 is positioned in contact with copper-containing electrolytic solution 72. The insoluble metal anode 73 is arranged at approximately the lower half of the metal cathode drum 71 and surrounds the metal cathode drum 71. The surface 74 of the rotatable cathode drum 71 can be polished to a mirror finish, thereby imparting the same finish to the drum side 75 of copper foil 21. Rollers 76, 77, 78 assist in stripping the copper foil from drum surface 74. The side of the copper foil 21, opposite the drum side 75 is called the deposit side 79, because the deposit side 79 is in contact with the copper-containing electrolytic solution 72 when it is formed. A copper foil 21 is continuously manufactured with the device by flowing a copper-containing electrolytic solution 72 between the cathode drum 71 and the insoluble metal anode 73, applying direct current (DC) between the anode and cathode to allow copper to be deposit on the surface 74 of cathode drum 71, and detaching an electrodeposited copper foil from the cathode drum 71 when a predetermined thickness is obtained. The copper foil 21 so removed from drum surface 74 can be immediately further processed or would upon spool 80 for storage.

Figure 8:
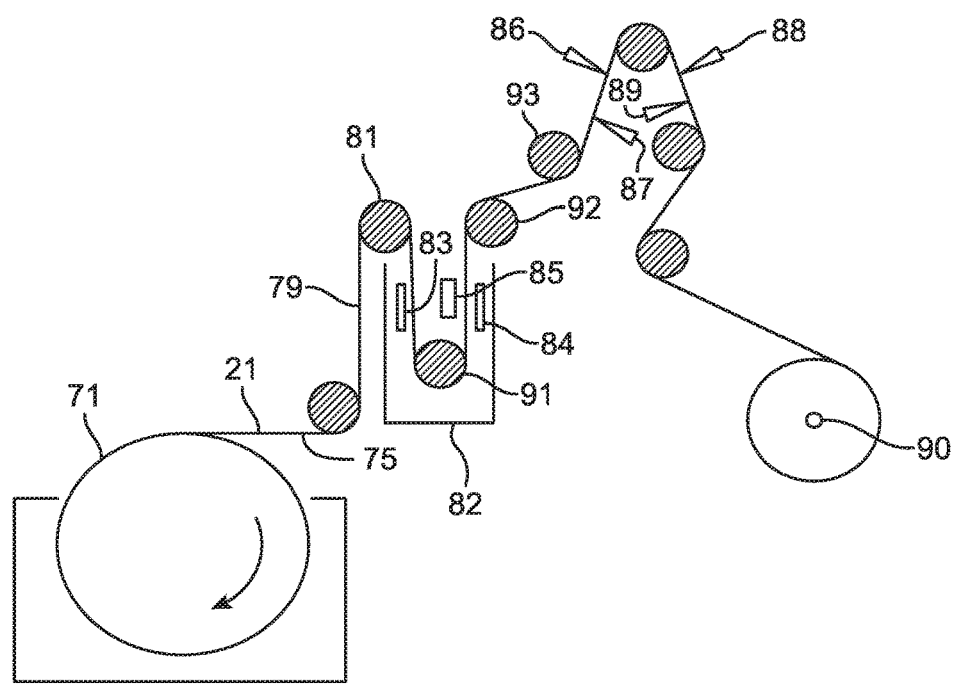
FIG. 8 is a schematic representation of an apparatus for making the electrodeposited copper foil according to a preferred embodiment including the steps of applying an anti-tarnish agent to the formed electrodeposited copper foil; and, FIG. 9 is a partially cross-sectioned schematic illustration of a cylindrical battery.

FIG. 8 illustrates a schematic embodiment where the copper foil 21 is further processed immediately after removal from the drum 71. Copper foil 21 is passed over guide roller 81 and into an anti-tarnish treatment tank 82. In treatment tank 82 is a treating solution, such as an organic agent, or alternatively, a solution which can contain zinc or chromium anti-tarnish agents, which are applied to copper foil 21 to prevent anti-tarnish and/or protect the property of the copper foil 21. Electrodes 83, 84 can be used in the case where electrolytic deposition of a metallic layer (such as one of the aforementioned anti-tarnish metals) onto the drum side 75 of copper foil 21 is desired. If it is desired to electrolytically deposit a metal on the deposit side 79 of copper foil 21, a further electrode 85 is provided. A series of guide rollers 91, 92, 93 conveys the copper foil 21 through and away from treatment tank 82. Air knives 86, 87, 88 and 89 are provided to carefully regulate and dry the anti-tarnish coating, as it is desired that the anti-tarnish layer be relatively thin as compared to the thickness of the copper foil as to not deleteriously affect the surface of the copper foil 21. Additional treatment tanks (not shown) can be provided for purposes of adding additional or different types of layers. After treatment, the copper foil 21 can be wound on spool 90 for storage or shipment.

EXAMPLES

The embodiments of the disclosure can be further understood in connection with the following Examples and Comparative Examples and the testing procedures describe hereinafter. It should be clearly understood that these are additional and more favorable conditions for achieving the electrodeposited copper foil for a lithium secondary battery according to the present invention. It should be understood within the scope of the present disclosure, the above-mentioned technical features and technical features mentioned below (such as example) can be combined freely and mutually to form new or preferred technical solutions, which are omitted for brevity.

Example 1

Manufacture of Electrodeposited Copper Foil

In Example 1, copper wires were dissolved in a 50 wt. % sulfuric acid solution to prepare a copper sulfate electrolyte containing 320 g/l of copper sulfate ($CuSO_4.5H_2O$) and 100 g/l of sulfuric acid. To per liter of the copper sulfate electrolyte, 0.8 mg of gelatin (DV: Nippi Company), 1.0 mg of sulfonic acid modified polyvinyl alcohol (TA-02F; Chang Chun Petrochemical Co., Ltd.), 1.3 mg of sodium 3-mercapto-1-propanesulfonate (MPS: HOPAX Company), 1.5 mg of N, N'-Diethylthiourea (Alfa Aesar®; A Johnson Matthey Company) and 40 mg chloride ion were added. Subsequently, an electrodeposited copper foil with a thickness of 6 μm was prepared at a liquid temperature of 50° C. and a current density of 50 $A/dm^2$.

Surface Anti-tarnish Treatment

After being electrodeposited on a cathode drum in an electrolytic solution, the electrodeposited copper foil is fed through a series of rollers. The electrodeposited copper foil is carried through an anti-tarnish treatment before being subjected to drying with air knives. Finally, the electrodeposited copper foil is wound. The surface of the electrodeposited copper foil was only treated with anti-tarnish treatment (for example a chromium plating treatment, chromic acid solution dipping treatment or organic treatment), the conditions were as shown in the below Table 1, and there was no nodule treatment (roughened) on the electrodeposited copper foil. The $L^*a^*b^*$ value was measured after applying an anti-tarnish treatment (anti-tarnish agent) on the copper surface.

TABLE 1

| Anti-tarnish treatment conditions | Anti-tarnish Agent | pH | Current Density ($A/dm^2$) | Plating or dipping time (Sec.) | Temperature of solution (° C.) |
|---|---|---|---|---|---|
| Chromium Plating | $CrO_3$ | 1.5 g/l | 2.03 | 0.5 | 2 | 25 |
| Chromic Acid solution Dipping | $CrO_3$ | 1.5 g/l | 2.03 | 0 | 2 | 25 |
| Organic treatment | BTA (1,2,3-benzotriazole) | 0.02% | — | 0 | 2 | 25 |

To control weight deviation, an insulative mask is attached to the dimensionally stable anode (insoluble metal anode) to adjust the weight deviation of the electrodeposited copper foil. Electrodeposition only occurs where the drum and the dimensionally stable anode are conductive. See U.S. Pat. No. 9,711,799, incorporated herein in its entirety.

The following Table 2 illustrates the parameter condition for producing copper foils in the Examples and Comparative Examples.

TABLE 2

| | | Example | | | | | | | | | |
|---|---|---|---|---|---|---|---|---|---|---|---|
| | Conditions | 1 | 2 | 3 | 4 | 5 | 6 | 7 | 8 | 9 | 10 |
| Manufacture of Electrodeposited Copper Foil | Copper Sulfate (g/l) | 320 | 320 | 320 | 320 | 320 | 320 | 320 | 320 | 320 | 320 |
| | Sulfuric acid (g/l) | 100 | 100 | 100 | 100 | 100 | 100 | 100 | 100 | 100 | 100 |
| | Concentration of gelatin (mg/l) | 0.8 | 0.8 | 0.8 | 0.8 | 0.8 | 0.7 | 0.8 | 0.8 | 0.8 | 0.8 |
| | Concentration of sulfonic acid modified polyvinyl alcohol (mg/l) | 1.0 | 1.5 | 1.5 | 1.5 | 1.0 | 0.9 | 1.0 | 1.0 | 1.0 | 1.0 |
| | Concentration of N,N'-Diethylthiourea (mg/l) | 1.5 | 1.0 | 2.5 | 3.0 | 1.5 | 1.3 | 1.5 | 1.5 | 1.5 | 1.5 |
| | Concentration of sodium 3-mercapto-1-propanesulfonate (mg/l) | 1.3 | 2.6 | 1.3 | 1.3 | 2.0 | 1.1 | 1.3 | 1.3 | 1.3 | 1.3 |
| | Chloride ion (mg/l) | 40 | 40 | 40 | 40 | 40 | 40 | 40 | 40 | 40 | 40 |
| | Temperature (° C.) | 50 | 50 | 50 | 45 | 50 | 50 | 50 | 50 | 50 | 50 |
| | Current density ($A/dm^2$) | 50 | 50 | 50 | 50 | 50 | 50 | 50 | 50 | 50 | 50 |
| Surface Anti-Tarnish Treatment | $CrO_3$ (g/l) | 1.5 | 1.5 | 1.5 | 1.5 | 1.5 | 1.5 | — | — | 1.5 | — |
| | BTA (%) | — | — | — | — | — | — | 0.02 | 0.01 | — | — |
| | Temperature (° C.) | 25 | 25 | 25 | 25 | 25 | 25 | 25 | 25 | 25 | — |
| | Current density ($A/dm^2$) | 0.5 | 0.5 | 0.5 | 0.5 | 0.5 | 0.5 | — | — | 0 | — |
| | Time (Sec.) | 2 | 2 | 2 | 2 | 2 | 2 | 2 | 2 | 2 | — |
| | pH | 2.03 | 2.03 | 2.03 | 2.03 | 2.03 | 2.03 | — | — | 2.03 | — |

TABLE 2-continued

|  | Conditions | Comparative Example | | | | | | |
|---|---|---|---|---|---|---|---|---|
|  |  | 1 | 2 | 3 | 4 | 5 | 6 | 7 |
| Manufacture of Electrodeposited Copper Foil | Copper Sulfate (g/l) | 320 | 320 | 320 | 320 | 320 | 320 | 320 |
|  | Sulfuric acid (g/l) | 100 | 100 | 100 | 100 | 100 | 100 | 100 |
|  | Concentration of gelatin (mg/l) | 0.8 | 0.8 | 0.8 | 0.8 | 0.8 | 0.8 | 0.4 |
|  | Concentration of sulfonic acid modified polyvinyl alcohol (mg/l) | 1.0 | 1.5 | 1.5 | 0.5 | 1.0 | 1.5 | 0.8 |
|  | Concentration of N,N'-Diethylthiourea (mg/l) | 0 | 1.0 | 3.0 | 3.0 | 1.5 | 2.5 | 1.2 |
|  | Concentration of sodium 3-mercapto-1-propanesulfonate (mg/l) | 1.6 | 2.6 | 0.8 | 1.3 | 1.3 | 2.6 | 1.2 |
|  | Chloride ion (mg/l) | 30 | 50 | 40 | 30 | 40 | 40 | 40 |
|  | Temperature (° C.) | 50 | 50 | 45 | 45 | 50 | 45 | 45 |
|  | Current density (A/dm$^2$) | 50 | 50 | 50 | 50 | 50 | 50 | 50 |
| Surface Anti-Tarnish Treatment | CrO$_3$ (g/l) | 1.5 | 1.5 | 1.5 | 1.5 | 1.5 | 1.5 | — |
|  | BTA (%) | — | — | — | — | — | — | — |
|  | Temperature (° C.) | 25 | 25 | 25 | 25 | 25 | 25 | 25 |
|  | Current density (A/dm$^2$) | 0.5 | 0.5 | 0.5 | 0.5 | 0.5 | 0.5 | — |
|  | Time (Sec.) | 2 | 2 | 2 | 2 | 2 | 2 | 2 |
|  | pH | 2.03 | 2.03 | 2.03 | 2.03 | 2.03 | 2.03 | 2.03 |

Test Methods Employed

1. Tensile Strength

Based on the method of IPC-TM-650, the electrodeposited copper foil was cut to obtain a test sample with the size of 100 mm×12.7 mm (length×width), and the test sample was measured at room temperature (about 25° C.) under the conditions of a chuck distance of 50 mm and a crosshead speed of 50 mm/min. by using Model AG-I testing machine of Shimadzu Corporation.

2. Elongation

Based on the method of IPC-TM-650, the electrodeposited copper foil was cut to obtain a test sample of 100 mm×12.7 mm (length×width), and the test sample was measured at room temperature (about 25° C.) under the conditions of a chuck distance of 50 mm and a crosshead speed of 50 mm/min. by using Model AG-I testing machine of Shimadzu Corporation.

3. Roughness

The measurement was conducted based on the method of JIS B 0601-1994 by using α Type Surface Roughness Measuring Instrument (Kosaka Laboratory Ltd.; SE 1700 Series). Surface roughness (Rz) (Ten points Mean Roughness) is obtained from the total in micron meter of the mean value of each distance between the mean line and the 5 peaks from the highest one and the 5 valleys from the lowest one, of the roughness curve in the range of sampled reference length.

4. Color L*a*b*

L*, a* and b* are numeric values determines based on the L*a*b* color system described in JIS Z 8729 and the measurement based on the method of JIS Z 8722 by using SPECTROPHOTOMETER (Konica-Minolta; CM2500c). In the measurement, a viewing angle (observer) is 2°, and a light source (illuminant) was D65.

5. Weight Deviation

The electrodeposited copper foil is cut into small pieces of 50 mm in length×50 mm in width. A microbalance (AG-204) manufactured by Mettler Toledo International Inc. was used to measure the test pieces. For each test piece, the numeric weight value of the reading was multiplied by 400 to obtain an area weight (g/m$^2$).

$$\text{Weight deviation (\%)} = \frac{\text{Maximum area weight (g/m}^2\text{)} - \text{minimum area weight (g/m}^2\text{)}}{\text{Average area weight (g/m}^2\text{)}} \times 100$$

6. Fracture Test after Pressing

An anode slurry was prepared using N-Methyl-2-pyrrolidone (NMP) as a solvent and the anode materials listed in the table 3 below with a solid-liquid ratio of 60% (100 g of anode materials; 60 g of NMP). After the components of anode material formulation are mixed, the carbon material is coated on the surface of copper foil at a speed of 5 meters per minute to a thickness of 200 μm and then dried through a 160° C. oven.

The anode (copper foil+anode active material) was then pressed in a roller press. The dimensions of the rollers of the roller press were 250 mm×250 mm, hardness of the rollers was 62~65° HRC, and the roller material was high-carbon chrome bearing steel (SUJ2). A 1 M/min. pressing speed and 3000 psi pressure were used and then the pressed materials were observed to determine whether the interface between the copper foil and the anode active material were fractured or not. The evaluation was made according to the following standards:

x: fully fractured
△: partially fractured
o: no fracture

TABLE 3

| Anode Material | % Based on Total Weight of Anode Materials |
|---|---|
| Anode active Material (Mesophase Graphite Powder Anode; MGPA) | 93.9 wt. % |
| Conductive Additive (Conductive Carbon Black; Super P ®) | 1 wt. % |
| Solvent-Based Binder (PVDF 6020, i.e., polyvinylidene fluoride) | 5 wt. % |
| Oxalic Acid | 0.1 wt. % |

7. Wrinkle Test after Pressing

An anode slurry was prepared using N-Methyl-2-pyrrolidone (NMP) as a solvent and the anode materials listed in the table 4 below with a solid-liquid ratio of 60% (100 g of anode materials; 60 g of NMP). After the components of the anode material formulation are mixed, the carbon material is coated on the surface of copper foil at a speed of 5 meters per minute to a thickness of 200 μm and then dried through a 160° C. oven.

The anode (copper foil+anode active material) was then pressed in a roller press. The dimensions of the rollers of the roller press were 250 mm×250 mm, hardness of the rollers was 62~65° HRC, and the roller material was high-carbon chrome bearing steel (SUJ2). A 1 M/min. pressing speed and 3000 psi pressure were used and then the pressed materials were observed to determine whether the interface between the copper foil and the anode active material were wrinkle or not. The evaluation was made according to the following standards:

x: wrinkle
o: no wrinkle

TABLE 4

| Anode Material | % Based on Total Weight of Anode Materials |
|---|---|
| Anode active Material (Mesophase Graphite Powder Anode; MGPA) | 93.9 wt. % |
| Conductive Additive (Conductive Carbon Black; Super P ®) | 1 wt. % |
| Solvent-Based Binder (PVDF 6020, i.e., polyvinylidene fluoride) | 5 wt. % |
| Oxalic Acid | 0.1 wt. % |

8. Charge-discharge Cycle Test

A laminated type lithium secondary battery was prepared as follows and subjected to a high c-rate charging and discharging test. N-methyl-2-pyrrolidone (NMP) was used as a solvent for a cathode material (at a solid to liquid ratio of 195 wt. % (100 g of the cathode material: 195 g of NMP) as shown in the table 5 below, so as to obtain a cathode slurry. NMP was used as a solvent for an anode material (at a solid to liquid ratio of 60 wt. % (100 g of the anode material: 60 g of NMP), so as to obtain an anode slurry.

TABLE 5

| Cathode Material formulation: Based on the total weight of the cathode material | |
|---|---|
| Cathode active material (LiCoO$_2$) | 89 wt. % |
| Conductive Additive (Flaked graphite; KS6) | 5 wt. % |
| Conductive additive (Conductive carbon powder; Super P ®) | 1 wt. % |
| Solvent -Based Binder (PVDF1300) | 5 wt. % |
| Anode material formulation: Based on the total weight of the anode material | |
| Anode active material (MGPA) | 93.9 wt. % |
| Conductive additive (Conductive carbon powder; Super P ®) | 1 wt. % |
| Solvent-Based binder (PVDF6020) | 5 wt. % |
| Oxalic acid | 0.1 wt. % |

Then, the cathode slurry was coated on aluminum foil, and the anode slurry was coated on the copper foils. After the solvents evaporated, the anode and cathode were pressed and slitted into certain sizes. Afterwards, cathodes and anodes are alternately stacked with a separator (manufactured by Celgard Company) sandwiched between, and placed in a container molded by laminate film. The container was then filled with an electrolyte, and sealed to form a battery. The size of the laminated type lithium secondary battery was 41 mm×34 mm×53 mm. The charging mode was the constant current-constant voltage (CCCV) mode, the charging voltage was 4.2 V, and the charging current was 5 C.

The discharging mode was the constant current (CC) mode, the discharging voltage was 2.8 V, and the discharging current was 5 C. The charging-discharging test on the batteries was conducted at high temperature (55° C.).

After 1000 times charge-discharge cycle test, the anode was removed from each battery to observe surface condition of copper foil and evaluation was made according to the following standards:
x: fully wrinkle
△: medium wrinkle
o: slightly wrinkle

TABLE 6

| | Example | | | | | | | | | |
|---|---|---|---|---|---|---|---|---|---|---|
| | 1 | 2 | 3 | 4 | 5 | 6 | 7 | 8 | 9 | 10 |
| Nominal Thickness (μm) | 6 | 6 | 6 | 6 | 6 | 6 | 6 | 6 | 6 | 6 |
| Tensile strength (kg/mm$^2$) | 51.2 | 40.3 | 61.3 | 69.6 | 52.3 | 51.6 | 51.1 | 51.2 | 51.2 | 51.2 |
| Elongation (%) | 5.5 | 5.9 | 5.3 | 4.7 | 5.3 | 5.4 | 5.6 | 5.5 | 5.6 | 5.5 |
| The surface roughness (Rz) of drum side (μm) | 1.78 | 1.64 | 1.62 | 1.68 | 1.64 | 1.98 | 1.78 | 1.77 | 1.78 | 1.78 |
| The surface roughness (Rz) of deposit side (μm) | 1.51 | 0.51 | 0.96 | 1.10 | 1.52 | 2.23 | 1.50 | 1.51 | 1.50 | 1.50 |
| The difference in surface roughness (Rz) between the drum side and deposit side (μm) | 0.27 | 1.23 | 0.66 | 0.58 | 0.12 | 0.25 | 0.28 | 0.26 | 0.28 | 0.28 |
| Lightness L* value of deposit side | 59.05 | 36.09 | 59.49 | 73.62 | 50.40 | 40.43 | 59.06 | 59.12 | 59.08 | 59.1 |
| a* value of deposit side | 13.15 | 11.02 | 14.68 | 17.29 | 12.72 | 10.81 | 13.12 | 13.18 | 13.17 | 13.16 |
| b* value of deposit side | 10.76 | 12.89 | 9.01 | 12.83 | 9.34 | 12.10 | 10.78 | 10.78 | 10.80 | 10.79 |
| Weight Deviation (%) | 1.21 | 1.99 | 1.72 | 1.77 | 2.86 | 1.65 | 1.22 | 1.22 | 1.21 | 1.22 |

TABLE 6-continued

| | | | | | | | | | | |
|---|---|---|---|---|---|---|---|---|---|---|
| Fracture test after pressing | ○ | ○ | ○ | ○ | ○ | ○ | ○ | ○ | ○ | —* |
| Wrinkle test after pressing | ○ | ○ | ○ | ○ | ○ | ○ | ○ | ○ | ○ | —* |
| Charge-discharge cycle test | ○ | ○ | ○ | ○ | ○ | ○ | ○ | ○ | ○ | —* |

*No additional tests (charge-discharge cycle, wrinkle, fracture, etc.) were carried out due to the oxidation which formed on the surfaces.

| | Comparative Example | | | | | | |
|---|---|---|---|---|---|---|---|
| | 1 | 2 | 3 | 4 | 5 | 6 | 7 |
| Nominal Thickness (μm) | 6 | 6 | 6 | 6 | 6 | 6 | 6 |
| Tensile Strength (kg/mm$^2$) | 34.8 | 40.6 | 69.5 | 76.2 | 51.3 | 60.2 | 47.9 |
| Elongation (%) | 5.8 | 5.7 | 4.7 | 2.5 | 5.6 | 5.3 | 5.6 |
| The surface roughness (Rz) of drum side (μm) | 1.75 | 1.68 | 1.69 | 1.74 | 1.75 | 2.1 | 1.76 |
| The surface roughness (Rz) of deposit side (μm) | 1.34 | 0.54 | 1.11 | 1.09 | 1.49 | 0.48 | 2.79 |
| The difference in surface roughness (Rz) between the drum side and the deposit side (μm) | 0.41 | 1.14 | 0.58 | 0.65 | 0.26 | 1.62 | 1.03 |
| Lightness L* value of deposit side | 26.24 | 33.15 | 78.12 | 65.56 | 60.88 | 58.82 | 62.99 |
| a* value of deposit side | 6.33 | 10.89 | 15.27 | 14.27 | 12.72 | 11.68 | 14.12 |
| b* value of deposit side | 5.38 | 12.71 | 14.12 | 11.26 | 10.94 | 13.23 | 12.91 |
| Weight deviation (%) | 1.62 | 1.65 | 1.58 | 1.65 | 3.36 | 1.37 | 1.39 |
| Fracture test after pressing | ○ | ○ | △ | x | ○ | ○ | △ |
| Wrinkle test after pressing | ○ | ○ | — | — | x | x | — |
| Charge-discharge cycle test | x | △ | — | — | — | — | — |

*When copper foil causes fracture or wrinkles after high pressure pressing process, charge-discharge cycle test is not conducted.

Discussion of Comparative Examples and Examples

1. The tensile strength of comparative example 1 is lower and Lightness L* value is also lower, the copper foil is soft. After high pressure pressing process, the copper foil does not fracture, but it is fully wrinkled after charge-discharge cycle test.

2. The tensile strength of comparative example 2 is in the range of 40 to 70 (kg/mm$^2$), but the Lightness L* value is out of the range, the toughness of copper foil becomes slightly lower, the copper foil has medium wrinkles after charge-discharge cycle test.

3. Although the tensile strength of comparative example 3 is high and in the range of 40-70 (kg/mm$^2$), the Lightness L* value is out of the range, the copper foil has become more brittle and the copper foil partially fractures after high pressure pressing process.

4. The tensile strength of comparative example 4 is too high, the copper foil is brittle and cause the copper foil to fully fracture after high pressure pressing process.

5. The weight deviation of comparative example 5 is larger than 3.0%, it is easy to cause wrinkles after high pressure pressing process at the interface between anode active material layer and the copper foil.

6. The difference in surface roughness (Rz) between the drum side and the deposit side of comparative example 6 is larger than 1.3 μm, it is also easy to cause wrinkles after the high pressure pressing process at the interface between anode active material and the copper foil.

7. The surface roughness (Rz) of deposit side of comparative example 7 is higher than 2.5 m, it is easy to cause fracture at the interface between anode active material and the copper foil after the high pressure pressing process.

8. The difference of example 1, 7, 8 and 9 is only the condition of the anti-tarnish treatment. Because the thickness of anti-tarnish layer is very thin, it doesn't affect the Lightness L* value of deposit side of copper foil.

9. The copper foil of example 10 was not conducted with anti-tarnish treatment, the color L*a*b* was measured immediately after producing. This example to show that anti-tarnish treatment didn't affect the color L*a*b* of copper foil, because the anti-tarnish treatment layer was very thin.

10. The copper foil of example 10 was not conducted with anti-tarnish treatment, the surface was easy to oxidize, so the copper foil was not conducted with fracture test after pressing, wrinkle test after pressing and charge-discharge cycle test.

It should be appreciated that throughout the specification and Examples that we have described ranges which may be regarded as endpoints of the range. However, it is to be expressly understood that values stated within these ranges may also constitute endpoints of the ranges themselves. For example, where we have described the tensile strength range as being 40-70 kg/mm$^2$, we have also described intermediate values of 51 (51.1 and 51.2, rounded down to 51) and 61 (61.3, rounded down to 61). Thus, it is to be expressly understood that in some embodiments, the range of tensile strength could vary from 51 to 70 kg/mm$^2$, or from 61 to 70 kg/mm$^2$, or from 51 to 61 kg/mm$^2$; or alternatively from 40 to 51 kg/mm$^2$ or from 40 to 61 kg/mm$^2$. The same could be stated for other ranges, including, but not limited to the surface roughness (Rz) of the drum side, the deposit side, and the difference in surface roughness (Rz) between the drum side and the deposit side, the property of elongation; the Lightness L*, a* and b* values and the weight deviation.

Further, while we have described our embodiments, they should be regarded as exemplary only and not limiting, as many modifications can be made by those skilled in the art without departing from the spirit or scope of the appended claims.

The disclosure of specific, including preferred embodiments, is intended to be exemplary of the embodiments described herein, but should not be construed as limiting the disclosure, parameters, process or method steps, copper foils, current collectors, batteries or other products incorporating the same.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

We claim:

1. An electrodeposited copper foil having a drum side and an opposite non-roughened deposit side;
   the electrodeposited copper foil having a tensile strength in the range of 40 to 70 kg/mm$^2$;
   wherein a surface roughness (Rz) of the opposite non-roughened deposit side of the electrodeposited copper foil is greater than 0.5 µm and lower than 2.0 µm;
   a lightness L* value of the deposit side, based on the L*a*b* color system described in JIS Z 8729, in the range of 40.43 to 74; and,
   a weight deviation (in %) calculated according to the following relationship for a 50 mm in length×50 mm in width sample:

$$\text{Weight deviation (\%)} = \frac{\text{Maximum area weight (g/m}^2\text{)} - \text{minimum area weight (g/m}^2\text{)}}{\text{Average area weight}} \times 100$$

of less than 3.

2. The electrodeposited copper foil of claim 1, wherein the surface roughness (Rz) of the drum side of the electrodeposited copper foil is lower than 2.5 µm.

3. The electrodeposited copper foil of claim 2, wherein a difference in surface roughness (Rz) between the drum side and the opposite non-roughened deposit side is at most 1.3 µm.

4. The electrodeposited copper foil of claim 1, wherein the tensile strength is in the range of 40 to 60 kg/mm$^2$.

5. The electrodeposited copper foil of claim 1, wherein the weight deviation is less than 2.

6. The electrodeposited copper foil of claim 1, wherein an a* value of the opposite non-roughened deposit side, based on the L*a*b* color system, is in the range of 11 to 18.

7. The electrodeposited copper foil of claim 1, wherein a b* value of the opposite non-roughened deposit side, based on the L*a*b* color system, is in the range of 9 to 13.

8. The electrodeposited copper foil of claim 1, wherein the electrodeposited copper foil comprises an elongation in the range of 4.7 to 6%.

9. The electrodeposited copper foil of claim 2, wherein a difference in surface roughness (Rz) between the drum side and the opposite non-roughened deposit side is in the range of 0.10 to 0.70 µm.

10. A rechargeable lithium secondary battery comprising the electrodeposited copper foil of claim 1.

11. An anode having a layer of anode active material in contact with the electrodeposited copper foil, wherein the electrodeposited copper foil is the electrodeposited copper foil of claim 1.

12. A laminated type lithium secondary battery comprising the electrodeposited copper foil of claim 1.

13. An electric vehicle (EV) comprising the rechargeable lithium secondary battery of claim 10.

14. A method of making the electrodeposited copper foil of claim 1, the method comprising:
    providing a drum, the drum capable of rotating while at least partially submerged in a copper-containing electrolytic solution;
    causing the copper-containing electrolytic solution to come in contact with the drum; applying a current through the copper-containing electrolytic solution between the drum,
    which acts as a cathode, and an insoluble anode in contact with the copper-containing electrolytic solution;
    electrodepositing copper from the copper-containing electrolytic solution on the drum to form the electrodeposited copper foil;
    separating the electrodeposited copper foil from the drum; and,
    recovering the electrodeposited copper foil.

15. The method of claim 14, further comprising applying an anti-tarnish agent on the electrodeposited copper foil.

16. The method of claim 14, wherein the copper-containing electrolytic solution comprises copper sulfate and sulfuric acid and at least
    one additive selected from the group consisting of gelatin, sulfonic acid modified polyvinyl alcohol, N, N'-diethylthiourea, sodium 3-mercapto-1-propane sulfonate, chloride ion and combinations thereof.

17. The method of claim 15, wherein the anti-tarnish agent comprises chromium.

18. The method of claim 15, wherein the anti-tarnish agent comprises BTA (1,2,3-benzotriazole).

19. The electrodepodsited copper foil of claim 1, wherein the tensile strength is in the range of 51.1 to 70 kg/mm$^2$.

* * * * *